US012583700B2

(12) United States Patent
Lee et al.

(10) Patent No.: US 12,583,700 B2
(45) Date of Patent: Mar. 24, 2026

(54) ELECTRODE CONNECTION APPARATUS AND ELECTRODE CONNECTION AUTOMATION METHOD USING THE SAME

(71) Applicant: LG Energy Solution, Ltd., Seoul (KR)

(72) Inventors: Young Soo Lee, Daejeon (KR); Jin Soo Lee, Daejeon (KR); Hong Ju Hwang, Daejeon (KR); Seung Hoo Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 319 days.

(21) Appl. No.: 17/915,000

(22) PCT Filed: Jul. 6, 2021

(86) PCT No.: PCT/KR2021/008580
§ 371 (c)(1),
(2) Date: Sep. 27, 2022

(87) PCT Pub. No.: WO2022/014934
PCT Pub. Date: Jan. 20, 2022

(65) Prior Publication Data
US 2023/0150784 A1     May 18, 2023

(30) Foreign Application Priority Data
Jul. 14, 2020     (KR) ........................ 10-2020-0087016

(51) Int. Cl.
*B65H 19/18*          (2006.01)
*B65H 19/10*          (2006.01)
(Continued)

(52) U.S. Cl.
CPC ....... *B65H 19/102* (2013.01); *B65H 19/1826* (2013.01); *B65H 20/16* (2013.01);
(Continued)

(58) Field of Classification Search
CPC ................ H01M 4/04; H01M 10/0409; B65H 2301/46115; B65H 2301/4622;
(Continued)

(56) References Cited

U.S. PATENT DOCUMENTS 3,440,126 A  *  4/1969  Robinson ........... B65H 19/1868
                                                    242/551
4,157,934 A  *  6/1979  Ryan .................. B65H 19/1873
                                                    242/551

(Continued)

FOREIGN PATENT DOCUMENTS

CN          102405437 A       4/2012
CN          108598547 A  *   9/2018   ......... B65H 19/1826
(Continued)

OTHER PUBLICATIONS

International Search Report for Application No. PCT/KR2021/008580 mailed Oct. 8, 2021, pp. 1-3.
EESR for Application No. 21842468.7 dated Mar. 11, 2024. 5 pgs.

*Primary Examiner* — Anna M Momper
*Assistant Examiner* — Henrix Soto
(74) *Attorney, Agent, or Firm* — Lerner David LLP

(57)          ABSTRACT

The present invention relates to an electrode connection apparatus including a transfer unit configured to transfer a start portion of a standby electrode roll in a state of gripping the start portion, a leading unit configured to move upwards in a state of gripping the start portion of the standby electrode roll transferred by the transfer unit, a first connection unit configured to fix the standby electrode roll transferred by the leading unit, a second connection unit configured to fix an end portion of a moving electrode roll, and a taping unit configured to connect the standby electrode roll and the moving electrode roll to each other, whereby it is possible to automatically connect the electrode rolls to each
(Continued)

other during an electrode manufacturing process performed as a roll-to-roll process.

10 Claims, 6 Drawing Sheets

(51) Int. Cl.

| | | |
|---|---|---|
| *B65H 20/16* | (2006.01) | |
| *H01M 10/04* | (2006.01) | |

(52) U.S. Cl.

CPC . *H01M 10/0409* (2013.01); *B65H 2301/4607* (2013.01); *B65H 2301/46115* (2013.01); *B65H 2301/4622* (2013.01); *B65H 2301/4631* (2013.01); *B65H 2701/19* (2013.01)

(58) Field of Classification Search

CPC ........... B65H 2301/46412; B65H 2301/46171; B65H 19/1826; B65H 19/102; B65H 19/28; B65H 20/16; B65H 19/1852; B65H 2301/4631

USPC ....................................................... 242/556.1

See application file for complete search history.

(56) References Cited

U.S. PATENT DOCUMENTS

| | | | | | |
|---|---|---|---|---|---|
| 4,878,982 | A | * | 11/1989 | Ogata | B65H 19/1873 |
| | | | | | 156/364 |
| 4,878,986 | A | * | 11/1989 | Nishikawa | B65H 19/20 |
| | | | | | 156/304.3 |
| 5,064,488 | A | * | 11/1991 | Dickey | B65H 21/02 |
| | | | | | 156/304.3 |
| 5,881,964 | A | | 3/1999 | Fujikura et al. | |
| 6,013,148 | A | * | 1/2000 | Bluemle | B65H 19/1873 |
| | | | | | 156/507 |
| 6,978,816 | B1 | * | 12/2005 | Byrne | B65H 19/286 |
| | | | | | 156/159 |
| 9,981,821 | B2 | * | 5/2018 | De Marco | B65H 19/1852 |
| 2001/0016120 | A1 | * | 8/2001 | Hara | B65H 19/1873 |
| | | | | | 396/387 |
| 2002/0060266 | A1 | * | 5/2002 | Lintelmann | B65H 19/1852 |
| | | | | | 242/595.1 |
| 2014/0034772 | A1 | * | 2/2014 | Giuliani | B65H 19/102 |
| | | | | | 242/556.1 |
| 2014/0361065 | A1 | * | 12/2014 | Ishimatsu | B65G 35/04 |
| | | | | | 226/38 |
| 2017/0137247 | A1 | * | 5/2017 | Sato | B65H 19/1842 |
| 2018/0162668 | A1 | | 6/2018 | Hong | |
| 2020/0139569 | A1 | | 5/2020 | Wi et al. | |

FOREIGN PATENT DOCUMENTS

| | | | | | |
|---|---|---|---|---|---|
| CN | 209853423 | U | | 12/2019 | |
| DE | 102014108461 | A1 | * | 12/2015 | ......... B65H 19/1852 |
| EP | 1162164 | A1 | | 12/2001 | |
| EP | 3865434 | A1 | | 8/2021 | |
| JP | 2008127093 | A | | 6/2008 | |
| JP | 4406593 | B2 | | 1/2010 | |
| KR | 100819183 | B1 | | 4/2008 | |
| KR | 20140009015 | A | | 1/2014 | |
| KR | 101479724 | B1 | | 1/2015 | |
| KR | 20160133264 | A | | 11/2016 | |
| KR | 101857396 | B1 | | 5/2018 | |
| KR | 20180068788 | A | | 6/2018 | |
| KR | 20180069390 | A | * | 6/2018 | |
| KR | 102043024 | B1 | | 11/2019 | |
| KR | 20200051053 | A | | 5/2020 | |
| KR | 102120098 | B1 | | 6/2020 | |
| KR | 20200066018 | A | | 6/2020 | |
| KR | 2021-0150111 | A | | 12/2021 | |

\* cited by examiner

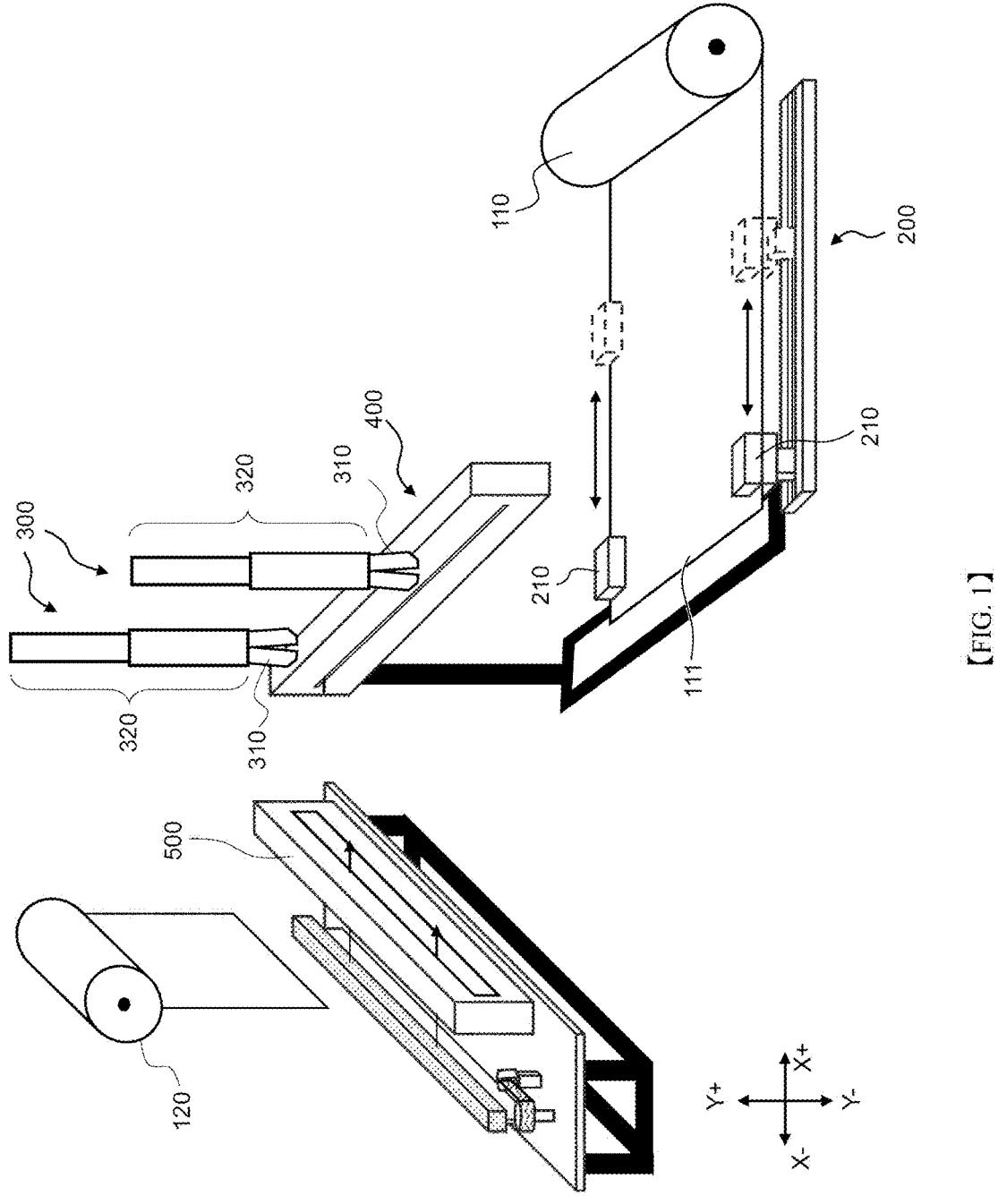
[FIG. 1]

【FIG. 2】
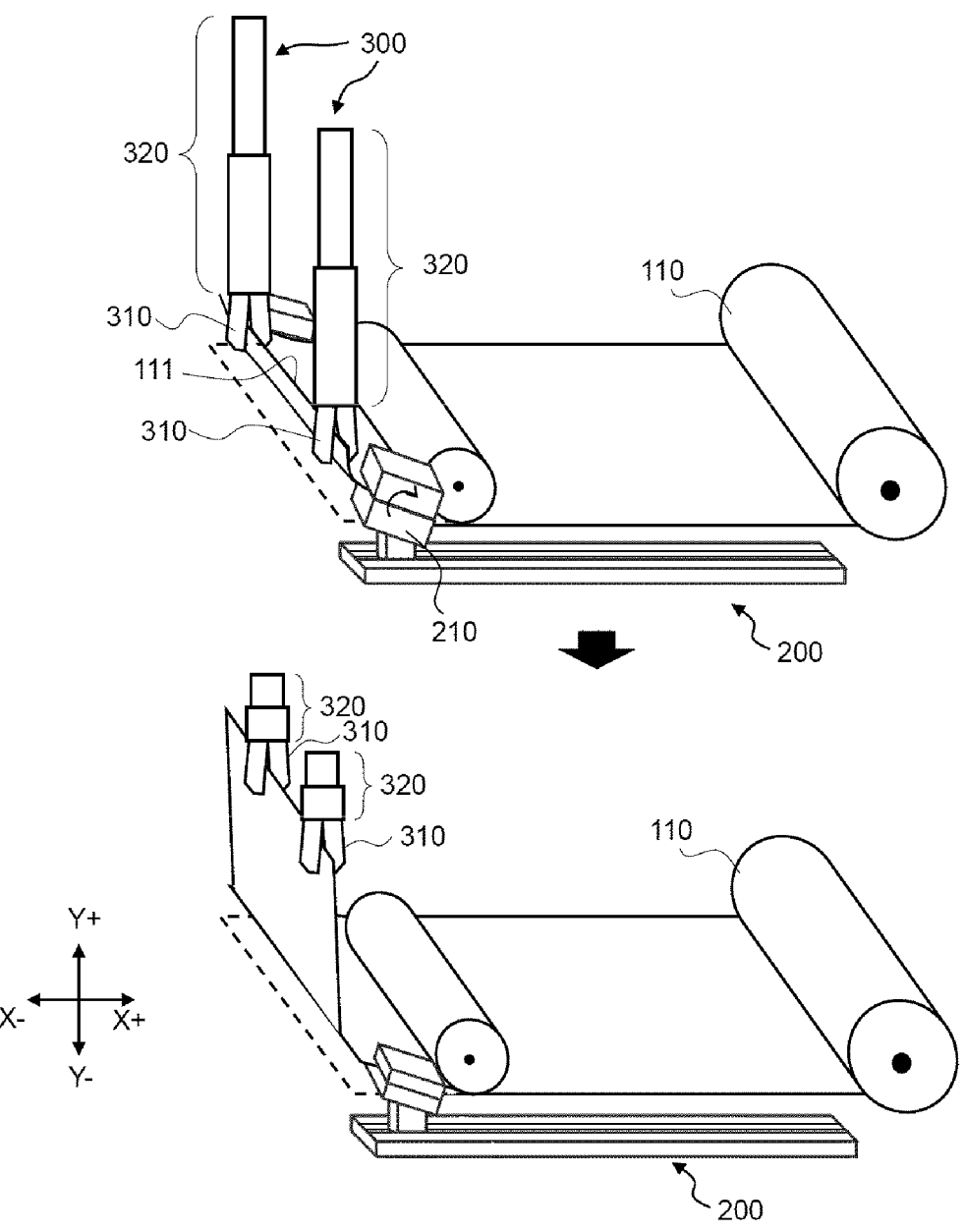

【FIG. 3】
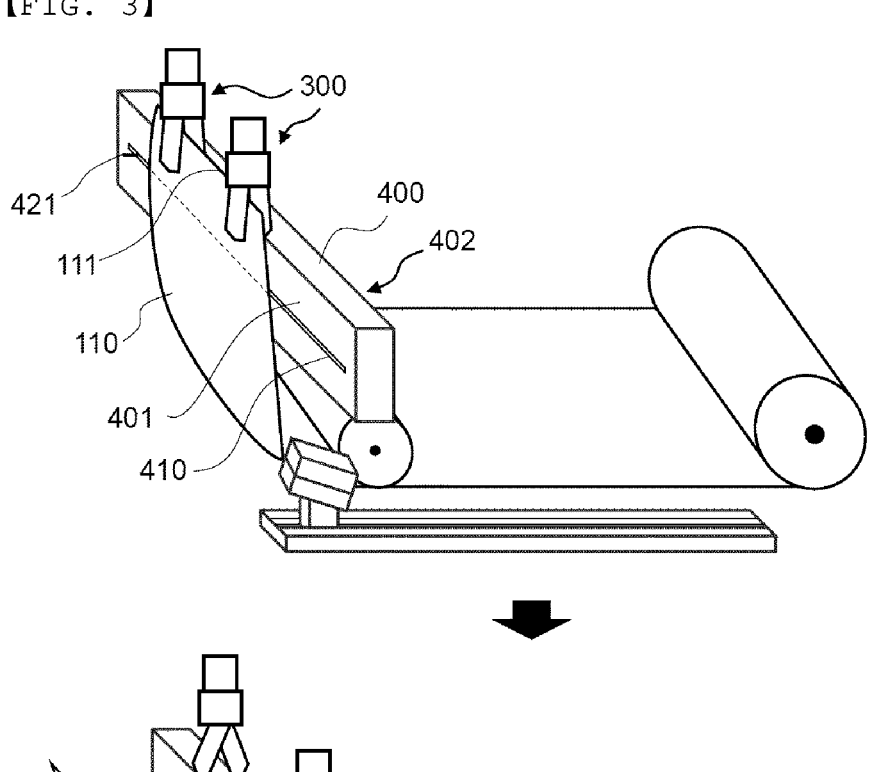
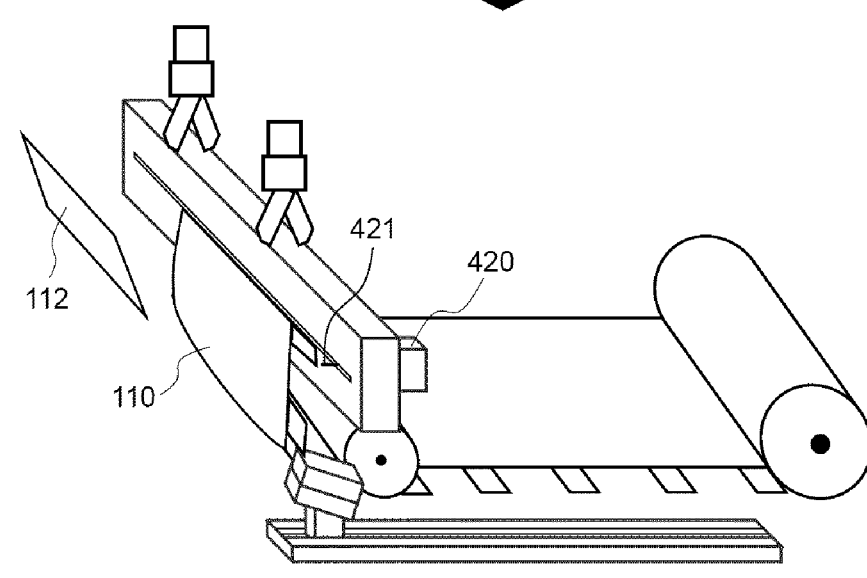

【FIG. 4】
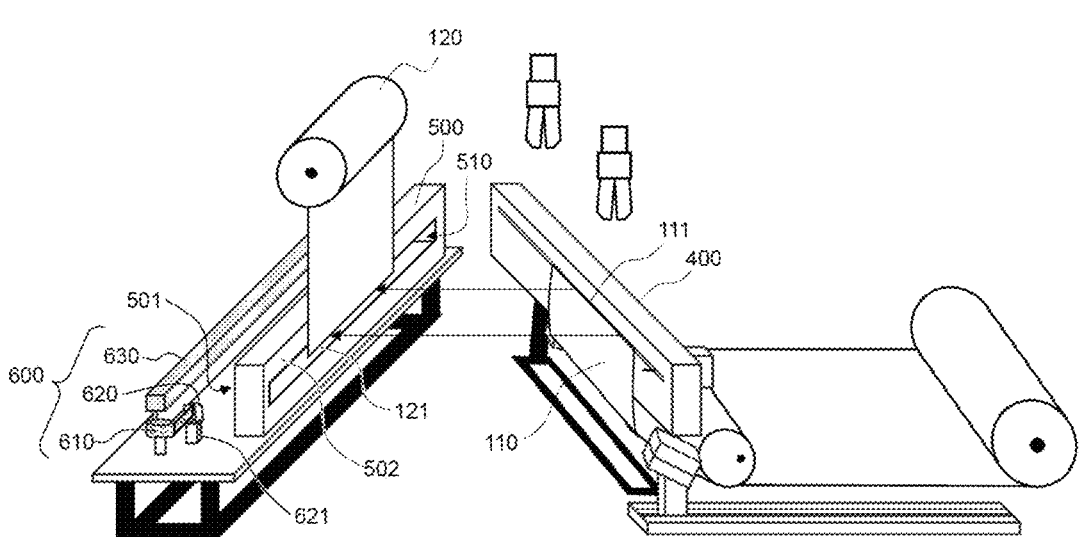

【FIG. 5】
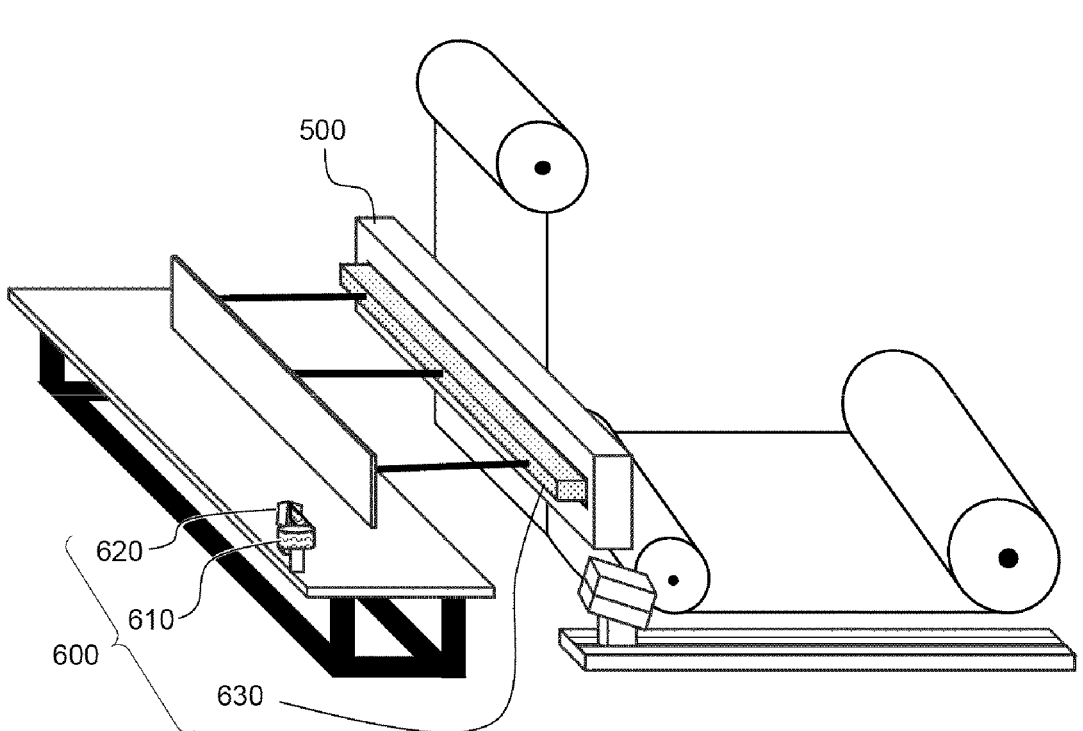

【FIG. 6】
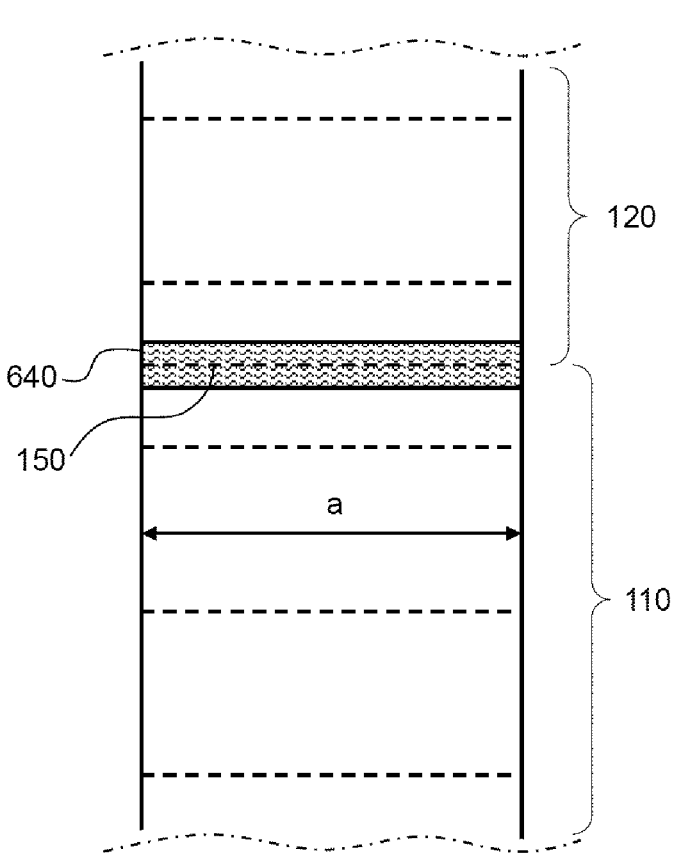

ELECTRODE CONNECTION APPARATUS AND ELECTRODE CONNECTION AUTOMATION METHOD USING THE SAME

CROSS-REFERENCE TO RELATED APPLICATIONS

This application is a national stage entry under 35 U.S.C § 371 of International Application No. PCT/KR2021/008580, filed on Jul. 6, 2021, which claims priority to Korean Patent Application No. 10-2020-0087016, filed on Jul. 14, 2020, the disclosures of which are hereby incorporated herein by reference in their entireties.

The present invention relates to an electrode connection apparatus and an electrode connection automation method using the same, and more particularly to an electrode connection apparatus capable of automatically connecting a new standby electrode roll to an end of a moving electrode roll during an electrode manufacturing process performed as a roll-to-roll process and an electrode connection automation method using the same.

BACKGROUND ART

A lithium secondary battery, which is capable of being charged and discharged, has been widely used as an energy source for wireless mobile devices or wearable devices, which are worn on bodies, and has also been used as an energy source for electric vehicles and hybrid electric vehicles presented as alternatives to existing gasoline and diesel vehicles, which cause air pollution.

In the lithium secondary battery, a positive electrode and a negative electrode are stacked in the state in which a separator is interposed therebetween, and lithium ions move between the positive electrode and the negative electrode, whereby the lithium secondary battery is repeatedly charged and discharged.

A process of manufacturing an electrode including the positive electrode and the negative electrode includes a step of coating the remaining part of an electrode sheet wound in the form of a roll, excluding parts at which electrode tabs are to be formed, with an electrode agent, a step of drying and rolling the electrode agent, a step of slitting the electrode sheet, and a step of notching the slit electrode sheet into unit electrodes.

An electrode manufacturing process is performed as a roll-to-roll continuous process. In the case in which an electrode roll wound in the form of a roll is completely consumed while electrodes are continuously manufactured using the electrode roll, a worker stops equipment, connects a tip of the electrode roll that is being used and a tip of a new electrode roll to each other using a tape, and reoperates the equipment.

In the case in which an electrode production process is suspended in order to replace the electrode roll and then the electrode production process is resumed, as described above, productivity is reduced.

In connection therewith, Patent Document 1 discloses an electrode production system for secondary batteries capable of connecting a first electrode material mounted to a first electrode material supply reel and a second electrode material mounted to a second electrode material supply reel to each other in order to perform a continuous process, but does not concretely disclose a method of automatically attaching a tape to the first electrode material and the second electrode material using a tape suction plate.

Patent Document 2 relates an automatic electrode film replacement apparatus configured such that, when an electrode film wound in the form of a roll is almost completely consumed during a process of continuously transferring the electrode film to manufacture a secondary battery, a tip of the electrode film that is being used and a tip of a new electrode film are automatically connected to each other by joining, whereby the secondary battery manufacturing process is continuously performed without interruption.

Patent Document 2 is capable of realizing joint connection when the electrode film that is being used and the new electrode film are moved and disposed so as to face each other, but does not disclose an apparatus capable of transferring the new electrode film to the electrode film that is being used and disposing the new electrode film when the electrode film that is being used is not disposed so as to face the new electrode film.

Therefore, there is a high necessity for technology capable of automatically connecting electrode rolls to each other without intervention of a worker even in the case in which the electrode rolls are not disposed so as to face each other when a continuous electrode manufacturing process is performed, whereby uniform electrode connection quality is achieved irrespective of skill of the worker.

PRIOR ART DOCUMENTS (Patent Document 1) Korean Registered Patent Publication No. 1857396 (2018.05.04)
(Patent Document 2) Korean Patent Application Publication No. 2016-0133264 (2016.11.22)

DISCLOSURE

Technical Problem

The present invention has been made in view of the above problems, and it is an object of the present invention to provide an electrode connection apparatus capable of continuously supplying an electrode roll without interruption during an electrode manufacturing process, whereby it is possible to improve productivity and to prevent occurrence of defects during an electrode roll connection process, and an electrode connection automation method using the same.

Technical Solution

In order to accomplish the above object, an electrode connection apparatus according to the present invention includes a transfer unit configured to transfer a start portion of a standby electrode roll in a state of gripping the start portion, a leading unit configured to move upwards in a state of gripping the start portion of the standby electrode roll transferred by the transfer unit, a first connection unit configured to fix the standby electrode roll transferred by the leading unit, a second connection unit configured to fix an end portion of a moving electrode roll, and a taping unit configured to connect the standby electrode roll and the moving electrode roll to each other.

In the electrode connection apparatus according to the present invention, the transfer unit may be configured to have a structure capable of moving toward the standby electrode roll in a first direction and moving in a second direction, which is a direction opposite the first direction, in a state of griping opposite side tips of the start portion of the standby electrode roll.

In the electrode connection apparatus according to the present invention, the leading unit may move downwards, may grip a tip of the start portion of the standby electrode roll, and may move upwards.

In the electrode connection apparatus according to the present invention, the first connection unit may fix the start portion of the standby electrode roll by suctioning.

In the electrode connection apparatus according to the present invention, the first connection unit may include a moving cutter configured to cut the standby electrode roll.

In the electrode connection apparatus according to the present invention, the standby electrode roll may be fixed to a first surface of the first connection unit, the moving cutter may be disposed at a second surface, which is an outer surface opposite the first surface, and the first connection unit may be provided with a slit such that the moving cutter cuts the standby electrode roll while moving therealong.

In the electrode connection apparatus according to the present invention, the first connection unit may be configured to have a structure in which the first connection unit moves toward the second connection unit such that a tip of the start portion of the standby electrode roll abuts the end portion of the moving electrode roll fixed to the second connection unit.

In the electrode connection apparatus according to the present invention, the end portion of the moving electrode roll may be fixed to a second surface of the second connection unit, and the taping unit may be disposed outside a first surface, which is an outer surface opposite the second surface.

In the electrode connection apparatus according to the present invention, the second connection unit may be provided with a penetrated portion configured to allow a tape of the taping unit to pass therethrough.

In the electrode connection apparatus according to the present invention, the taping unit may include a supply portion configured to supply a tape, a tape gripper configured to transfer the tape supplied by the supply portion to an attachment portion, and the attachment portion configured to move to an electrode roll connection portion in a state of fixing the tape, and the tape gripper may be provided with a tape cutter configured to cut the tape.

In addition, the present invention provides an electrode connection automation method using the electrode connection apparatus, the electrode connection automation method including (a) transferring a start portion of a standby electrode roll in a state of gripping the start portion, (b) the leading unit moving downwards to grip the start portion of the standby electrode roll and transferring the start portion of the standby electrode roll to the first connection unit, (c) cutting the start portion of the standby electrode roll, and (d) connecting the standby electrode roll and a moving electrode roll to each other.

The electrode connection automation method according to the present invention may include moving the standby electrode roll in a direction toward the moving electrode roll after step (c).

In the electrode connection automation method according to the present invention, step (d) may include mounting a tape to the attachment portion of the taping unit and attaching the tape to a connection portion at which the start portion of the standby electrode roll and an end portion of the moving electrode roll are connected to each other.

Advantageous Effects

As is apparent from the above description, an electrode connection apparatus according to the present invention includes a transfer unit and a leading unit. Even though a start portion of a standby electrode roll and an end portion of a moving electrode roll do not face each other in parallel with each other, therefore, it is possible to automatically connect the electrode rolls to each other.

Also, in the case in which the electrode connection apparatus according to the present invention is used, a tape is attached to only one surface of each of the standby electrode roll and the moving electrode roll, whereby it is possible to simplify a connection process, and therefore it is possible to improve productivity.

DESCRIPTION OF DRAWINGS

FIG. 1 is a perspective view of an electrode connection apparatus according to the present invention.

FIG. 2 is a perspective view showing a process of transferring a standby electrode roll using a transfer unit and a leading unit of FIG. 1.

FIG. 3 is a perspective view showing a process of cutting the standby electrode roll using a first connection unit of FIG. 1.

FIG. 4 is a perspective view showing movement of the standby electrode roll cut in FIG. 3 to a second connection unit of FIG. 1.

FIG. 5 is a perspective view showing a process of attaching a tape to an electrode roll connection portion.

FIG. 6 is a plan view showing the state in which the standby electrode roll and a moving electrode roll are connected to each other.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

FIG. 1 is a perspective view of an electrode connection apparatus according to the present invention.

Referring to FIG. 1, the electrode connection apparatus according to the present invention includes a transfer unit 200 configured to transfer a start portion 111 of a standby electrode roll in a state of gripping the start portion, a leading unit 300 configured to move upwards in a state of gripping the start portion 111 of the standby electrode roll transferred by the transfer unit 200, a first connection unit 400 configured to fix the standby electrode roll 110 transferred by the leading unit 300, and a second connection unit 500 configured to fix an end portion of a moving electrode roll 120.

An electrode connection automation method using the electrode connection apparatus includes (a) a step of transferring a start portion 111 of a standby electrode roll in a state of gripping the start portion, (b) a step of the leading unit 300 moving downwards to grip the start portion 111 of the standby electrode roll and transferring the start portion 111 of the standby electrode roll to the first connection unit 400, (c) a step of cutting the start portion 111 of the standby electrode roll, and (d) a step of connecting the standby electrode roll 110 and a moving electrode roll 120 to each other.

In addition, a process of moving the standby electrode roll 110 in a direction toward the moving electrode roll 120 after step (c) may be included, and step (d) may include a process of mounting a tape to an attachment portion of a taping unit and a process of attaching the tape to a connection portion at which the start portion of the standby electrode roll and an end portion of the moving electrode roll are connected to each other.

The transfer unit 200, the leading unit 300, the first connection unit 400, and the second connection unit 500 shown in FIG. 1 constitute an embodiment. The structures of the units are not limited to structures shown in this specification as long as the units are capable of performing functions that will be described below.

In a concrete example, the transfer unit 200 includes two transfer grippers 210. The transfer grippers 210 are disposed spaced apart from each other so as to grip opposite side tips of the standby electrode roll in a moving direction thereof. In addition, the transfer grippers 210 move toward the standby electrode roll 110, grip the standby electrode roll 110, and transfer the standby electrode roll in a direction toward the leading unit within a predetermined section in a state of being mounted to the transfer unit 200.

The transfer unit 200 moves toward the standby electrode roll 110 in a first direction, which is an x+ direction, and grips the opposite side tips of the start portion 111 of the standby electrode roll using the transfer grippers 210. When the transfer unit moves in a second direction, which is an x– direction, in this state, the standby electrode roll 110 is withdrawn.

FIG. 2 is a perspective view showing a process of transferring the standby electrode roll using the transfer unit and the leading unit of FIG. 1.

Referring to FIG. 2, when the transfer unit 200 moves in the x– direction in the state in which the transfer grippers 210 of the transfer unit grip the opposite side tips of the start portion 111 of the standby electrode roll 110, the standby electrode roll 110 is withdrawn.

When the start portion 111 of the standby electrode roll reaches under the leading unit 300, the transfer grippers 210 are rotated in a direction indicated by an arrow such that a tip of the start portion 111 of the standby electrode roll faces the leading unit 300. Even though the leading unit 300 moves only in an upward-downward direction, therefore, a process of the leading unit 300 gripping the start portion 111 of the standby electrode roll may be easily performed.

In order for the leading unit 300 to grip the start portion 111 of the standby electrode roll, the length of a length adjustment portion 320 of the leading unit 300 is increased, whereby a leading gripper 310 may grip the start portion 111 of the standby electrode roll, the tip of which is bent upwards. When the length of the length adjustment portion 320 is decreased in the state in which the leading gripper 310 grips the tip of the start portion 111 of the standby electrode roll, the start portion 111 of the standby electrode roll may be moved upwards.

FIG. 3 is a perspective view showing a process of cutting the standby electrode roll using the first connection unit of FIG. 1.

Referring to FIG. 3, the start portion 111 of the standby electrode roll moved upwards by the leading unit 300 is fixed to a first surface 401 of the first connection unit 400.

The first surface 401 may be configured as a suction portion. For example, a vacuum hole may be formed in a first surface 401, and a vacuum decompression cylinder may be coupled to the first connection unit 400. Consequently, the standby electrode roll 110 may be fixed to the first surface 401 by suctioning of the suction portion.

The first connection unit 400 may be provided with a moving cutter 420 configured to cut the standby electrode roll 110. The cutting position of the standby electrode roll 110 may be set in consideration of the position of the electrode roll connection portion at which the standby electrode roll 110 and the moving electrode roll 120 are connected to each other, and then cutting may be performed by the moving cutter 420.

The standby electrode roll is fixed to the first surface 401 of the first connection unit 400, and the moving cutter 420 is disposed at a second surface 402, which is an outer surface opposite the first surface 401. The moving cutter 420 is disposed such that a part of a knife edge 421 protrudes outwards from one side tip portion of the first surface 401. In this state, the moving cutter 420 cuts the standby electrode roll 110 while moving to the other side tip portion of the first surface 401. A slit 410 is formed in the first connection unit 400 such that the moving cutter 420 can be moved as described above.

A residual electrode 112 formed as the result of cutting performed by the moving cutter 420 is removed.

FIG. 4 is a perspective view showing movement of the standby electrode roll cut in FIG. 3 to the second connection unit of FIG. 1.

Referring to FIG. 4, an end portion 121 of the moving electrode roll 120 is fixed to a second surface 502 of the second connection unit 500, and a taping unit 600 is disposed outside a first surface 501, which is an outer surface opposite the second surface 502.

The second surface 502 of the second connection unit 500 may be configured as a suction portion. For example, a vacuum hole may be formed in the second surface 502, and a vacuum decompression cylinder may be coupled to the second connection unit 500. Consequently, the moving electrode roll 120 may be fixed to the second surface 502 by suctioning of the suction portion.

The first connection unit 400 moves toward the second connection unit 500 such that the tip of the start portion 111 of the standby electrode roll abuts the end portion 121 of the moving electrode roll 120.

The standby electrode roll 110 is attached to the second surface 502 of the second connection unit 500 such that the start portion 111 of the standby electrode roll and the end portion 121 of the moving electrode roll 120 come into contact with each other. At this time, air suctioning performed by the suction portion of the first connection unit 400 to suction the standby electrode roll 110 is interrupted, and the second connection unit 500 starts to suction the standby electrode roll 110, whereby the standby electrode roll 110 is fixed to the second surface 502 of the second connection unit 500.

A tape is attached to the electrode roll connection portion at which the standby electrode roll attached to the second surface 502 of the second connection unit 500 and the moving electrode roll join each other using the taping unit 600 disposed outside the first surface 501 of the second connection unit 500. The second connection unit 500 is provided with a penetrated portion 510, through which the tape of the taping unit 600 passes.

FIG. 5 is a perspective view showing a process of attaching a tape to the electrode roll connection portion.

Referring to FIG. 5 together with FIG. 4, the taping unit 600 includes a supply portion 610 configured to supply a tape, a tape gripper 620 configured to withdraw the tape supplied by the supply portion 610 in a state of gripping the tape such that the tape is disposed at the outer surface of an attachment portion 630, and the attachment portion 630 configured to move to the electrode roll connection portion in a state of fixing the tape. In addition, the tape gripper 620 is provided with a tape cutter (not shown) configured to cut the tape.

The tape gripper 620 grips a tip of a tape roll, and disposes the tape such that a non-adhesive surface of the tape is located at the outer surface of the attachment portion 630. At this time, the attachment portion fixes the non-adhesive surface of the tape by suctioning. Suctioning of the attachment portion may be performed in the same manner as the suction portion of each of the first connection unit and the second connection unit. A vacuum decompression suctioning method may be used.

The tape gripper 620 returns to the position before the tape is transferred, and the tape withdrawn from the tape roll is cut in a state of being gripped. At this time, the tape is cut to a length necessary to be attached to the electrode roll connection portion, and is attached to the attachment portion 630.

The attachment portion 630 is movable by a transfer means, and may pass through the penetrated portion 510 formed in the second connection unit 500 in order to attach the tape to the electrode roll connection portion.

FIG. 6 is a plan view showing the state in which the standby electrode roll and the moving electrode roll are connected to each other.

Referring to FIG. 6, the state in which the tape 640 is attached to the electrode roll connection portion 150 at which the moving electrode roll 120 and the standby electrode roll 110 are connected to each other, whereby the two electrode rolls are connected to each other, is shown.

Since the tip of the standby electrode roll 110 is cut by the moving cutter, which moves along the slit formed in the first connection unit, the standby electrode roll may be cut in parallel to a lateral direction a of the electrode roll.

As a result, the line along which the ends of the standby electrode roll and the moving electrode roll join each other at the electrode roll connection portion 150 may be straight. Consequently, overlapping between both electrodes at the electrode roll connection portion 150 may be minimized, whereby it is possible to prevent occurrence of a difference in thickness at the electrode roll connection portion 150.

In the case in which the electrode connection apparatus according to the present invention and the electrode connection automation method using the electrode connection apparatus are used, as described above, it is possible to automatically connect the standby electrode roll and the moving electrode roll to each other. Consequently, it is not necessary to suspend the process in order to connect the electrode rolls to each other, and the electrode roll connection portion may be uniformly formed, whereby it is possible to improve productivity in an electrode manufacturing process.

Those skilled in the art to which the present invention pertains will appreciate that various applications and modifications are possible within the category of the present invention based on the above description.

DESCRIPTION OF REFERENCE NUMERALS

110: Standby electrode roll
111: Start portion of standby electrode roll
112: Residual electrode
120: Moving electrode roll
121: End portion of moving electrode roll
150: Electrode roll connection portion
200: Transfer unit
210: Transfer gripper
300: Leading unit
310: Leading gripper
320: Length adjustment portion
400: First connection unit
401: First surface
402: Second surface
410: Slit
420: Moving cutter
421: Knife edge
500: Second connection unit
501: First surface
502: Second surface
510: Penetrated portion
600: Taping unit
610: Supply portion
620: Tape gripper
621: Tape cutter
630: Attachment portion
640: Tape

INDUSTRIAL APPLICABILITY

As is apparent from the above description, an electrode connection apparatus according to the present invention includes a transfer unit and a leading unit. Even though a start portion of a standby electrode roll and an end portion of a moving electrode roll do not face each other in parallel with each other, therefore, it is possible to automatically connect the electrode rolls to each other.

Also, in the case in which the electrode connection apparatus according to the present invention is used, a tape is attached to only one surface of each of the standby electrode roll and the moving electrode roll, whereby it is possible to simplify a connection process, and therefore it is possible to improve productivity.

The invention claimed is:

1. An electrode connection apparatus comprising:

a transfer unit configured to transfer a start portion of a standby electrode roll in a horizontal direction while gripping the start portion;

a leading unit configured to move upwards in a vertical direction perpendicular to the horizontal direction while gripping the start portion of the standby electrode roll;

a first connection unit configured to fix the start portion of the standby electrode roll to a fixing surface thereof, the fixing surface extending in a first vertical plane parallel to the vertical direction and perpendicular to the horizontal direction;

a second connection unit configured to fix an end portion of a moving electrode roll to a fixing surface thereof, the fixing surface extending in a second vertical plane parallel to the first vertical plane; and a taping unit configured to connect the start portion of the standby electrode roll and the end portion of the moving electrode roll to each other by moving a tape of the taping unit in the horizontal direction to contact the start portion of the standby electrode roll and the end portion of the moving electrode roll, the taping unit having an attachment portion configured to fix a non-adhesive surface of the tape thereto by suctioning, wherein the transfer unit comprises a pair of transfer grippers spaced apart from each other and is configured to grip the start portion of the standby electrode roll, wherein the electrode connection apparatus is configured such that when the first connection unit moves toward the second connection unit, an edge of the start portion of the standby electrode roll abuts an edge of the end portion of the moving electrode roll, wherein the transfer unit is configured to rotate the start portion of the standby electrode roll to change motion of the start portion from the horizontal direction to the vertical direction, wherein the electrode connection apparatus is configured to fix the end portion of the moving electrode roll to a second surface of the second connection unit, and the taping unit is disposed adjacent to a first surface of the second connection unit, the first surface being an outermost surface of the second connection unit parallel to and opposite the second surface, and wherein the second connection unit has an opening extending therethrough from the first surface to the second surface, the opening being configured to receive the attachment portion and the tape of the taping unit passing therethrough, the second surface of the second connection unit configured to fix the end portion of the moving electrode roll thereto by suctioning.

2. The electrode connection apparatus according to claim 1, wherein the transfer unit is configured to move toward the standby electrode roll in a first direction and in a second direction opposite the first direction while gripping opposite side edges of the start portion of the standby electrode roll.

3. The electrode connection apparatus according to claim 1, wherein the leading unit is configured to move downwards, grip an edge of the start portion of the standby electrode roll, and move upwards.

4. The electrode connection apparatus according to claim 1, wherein the first connection unit is configured to fix the start portion of the standby electrode roll thereto by suctioning.

5. The electrode connection apparatus according to claim 1, wherein the first connection unit comprises a moving cutter configured to cut the standby electrode roll.

6. The electrode connection apparatus according to claim 5, wherein the electrode connection apparatus is configured to fix the start portion of the standby electrode roll to a first surface of the first connection unit, the first connection unit has the moving cutter disposed at a second surface thereof, the second surface being an outer surface of the first connection unit opposite the first surface, and the first connection unit has a slit configured to slidably receive the moving cutter therein, such that when the moving cutter slides along the slit, the moving cutter cuts the standby electrode roll.

7. The electrode connection apparatus according to claim 1, wherein the taping unit comprises:

a supply portion configured to supply a tape;

a tape gripper configured to transfer the tape to an attachment portion of the taping unit; and the attachment portion being configured to move to an electrode roll connection portion of the start portion of the standby electrode roll and the end portion of the moving electrode roll to fix the tape to the electrode roll connection portion, and the tape gripper has a tape cutter configured to cut the tape.

8. An electrode connection automation method using the electrode connection apparatus according to claim 1, the electrode connection automation method comprising:

(a) transferring the start portion of the standby electrode roll while gripping the start portion;

(b) moving the leading unit downwards, gripping the start portion of the standby electrode roll, and transferring the start portion of the standby electrode roll to the first connection unit;

(c) cutting the start portion of the standby electrode roll; and (d) connecting the start portion of the standby electrode roll and the end portion of the moving electrode roll to each other.

9. The electrode connection automation method according to claim 8, further comprising, after step (c), moving the start portion of the standby electrode roll in a direction toward the moving electrode roll.

10. The electrode connection automation method according to claim 8, wherein step (d) comprises:

mounting a tape to an attachment portion of the taping unit; and attaching the tape to a connection portion at which the start portion of the standby electrode roll and the end portion of the moving electrode roll abut each other.

* * * * *